THE COLOR SYSTEM IN MEAT CURING.
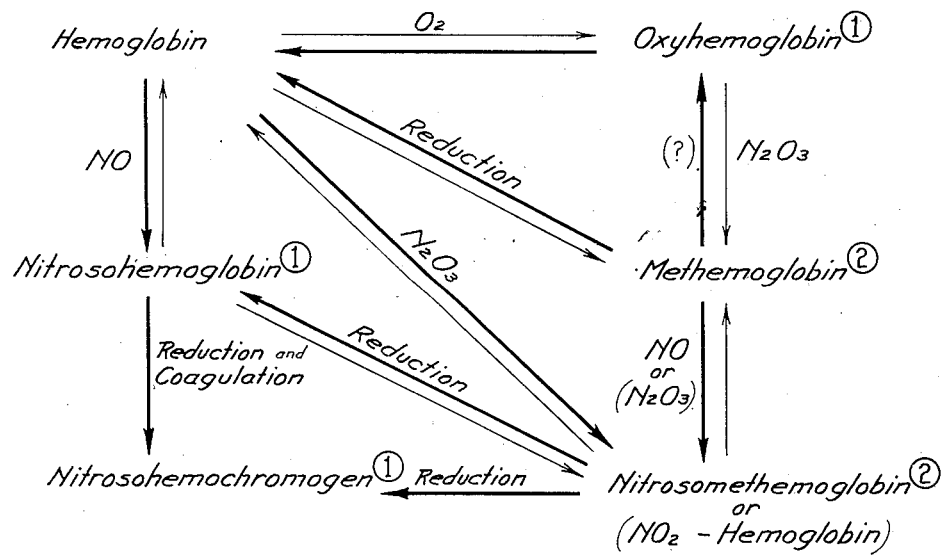
(Heavy arrows indicate desirable reactions)
① Desirable Pigments.
② Undesirable Pigments.
Inventor:
Winford Lee Lewis.
By Roland C. Rehm
Atty.

Patented Feb. 14, 1939

2,147,261

UNITED STATES PATENT OFFICE 2,147,261

PRODUCING STABLE COLOR IN MEATS

Winford Lee Lewis, Evanston, Ill., assignor to Corn Industries Research Foundation, Roby, Ind., a corporation of Indiana Application May 23, 1936, Serial No. 81,385

5 Claims. (Cl. 99—107)

This invention relates to the treatment or curing of meat, and among other objects aims to improve and to produce stable color in fresh and cured meats by means and methods which fall clearly within permitted practices.

The nature of the invention may be readily understood by reference to illustrative methods embodying the invention and described in the following specification and partly illustrated in the drawing.

The drawing comprises a diagram intended to illustrate graphically the color system in meat curing.

The practice of curing meat is of very ancient origin. "Curing" characterizes a composite of several changes which the meat undergoes, i. e., physical, chemical and biological changes. The physical changes comprise diffusion of curing ingredients, such as salt, sugar and color fixatives (nitrates and nitrites) through the meat. The chemical changes occur in both the curing ingredients and in the meat itself, such, for example, as the series of changes by which a color fixative, such as sodium nitrate and hemoglobin become nitroso-hemoglobin, the fixed cured color. The biological changes which are not sharply differentiated from the chemical, such as enzymic, are those brought about by micro-organic life.

The unique cured flavor of meat is no doubt the resultant of all the foregoing changes.

The present invention relates to the production and fixing of the desirable pink color which characterizes cured meat. It is unnecessary to stress here the importance which the purchasing public attaches to bloom or color. The fact is that meat, especially cured meat in which the color has faded or changed, while otherwise entirely wholesome, can be sold only at substantial decrease in price or at a loss.

It has been found that there are at least six color complexes or groups of color substances involved in the processing and merchandizing of meat. These are (1) hemoglobin, (2) methemoglobin, (3) nitroso-hemoglobin, (4) oxidized nitroso-hemoglobin, (5) nitroso-hemochromogen, and (6) oxidized forms of nitroso-hemochromogen.

Hemoglobin is the natural red coloring matter in fresh meat. Methemoglobin is an oxidized form of hemoglobin possessing a gray or brownish color. Nitroso-hemoglobin is the fixed pink color in cured meat which is heat-stable in respect to color. Oxidized nitroso-hemoglobin, as the name implies, is a combination of oxygen and nitroso-hemoglobin of unknown composition but of undesirable color from the standpoint of merchandizing cured meat, being a grayish brown. Nitroso-hemochromogen is a form of nitroso-hemoglobin in which the globin fraction has been separated from the hematin fraction. It is of a pink color; but its oxidized forms which have been designated above as oxidized nitroso-hemochromogens are of undesirable color, being an indifferent grayish green or grayish brown. The nitroso-hemochromogens are derived from the nitroso-hemoglobins by several agents, mainly heat. Nitroso-hemochromogen is, therefore, a form of pink color found in cooked or smoked products, and is present in varying degree depending upon the intensity of the heat application. It is by far the most stable of the desirable pigments and any reactions leading to its formation during a cure are to be desired and encouraged.

To summarize: of the aforesaid six color substances, three are desirable from the standpoint of consumer choice and three are undesirable, the latter being those designated as oxidized forms of hemoglobin, of nitroso-hemoglobin, and of nitroso-hemochromogen.

Oxidation which results in fading and discoloration by the production of the aforesaid oxidized forms of color complexes is spontaneous to some degree, depending upon hidden factors. It is accelerated by light, air, chemical oxidizing agents, such as hydrogen peroxide, and organic oxidizing agents, such as the organic peroxides. Hydrogen peroxide-producing bacteria and certain sulphur forms will effect oxidation as will also organic peroxides in the associated fat. Under these circumstances, it is evident that the conditions under which the meat is treated, handled and stored, considerably complicate the problem of stabilizing color.

I have discovered that reducing sugar, such as dextrose-starch conversion sugars, will protect or stabilize the desirable colors once they have been formed, protect the nitroso-hemoglobin from oxidative damage until it is converted into the more stable nitroso-hemochromogen, and hold the material meat pigments in reduced or more reactive condition until they can react with the nitrite. It may in certain cases restore a desirable color which has been previously destroyed. Reducing sugars, moreover, greatly diminish and even prevent the "greening" scourge which harasses manufacturers of sausage. While the function of the reducing sugar is not known with absolute certainty, it is probable that a reducing sugar such as dextrose or invert sugar, acts as a buffer or anti-oxidant, protecting the color quality of the meat from deterioration or destruction through oxidation. Furthermore, under certain conditions, the desirable color in meat already discolored may be restored by treatment with reducing sugar.

In producing a stable color in cured meat, for example, it is important, apparently, that the reducing sugar, as such be available or present in adequate amounts at an early stage in the curing process to encounter the color complexes when they are in a condition most favorable to the production of a stable color. This time factor is particularly important in the modern or so-called short cures. A short cure is characterized by the direct use of nitrites in the pickle or curing material instead of nitrates. There is little or no opportunity in a short cure for the possible or uncertain development of adequate invert sugar from the cane sugar which has, heretofore, been used as a sweetening or flavoring substance. However, formation of invert sugar from cane sugar is largely a matter of chance, depending upon a number of unpredictable and uncontrollable factors, such as time, temperature, moisture, hydrogen ions and the presence of invertase from such sources as micro-organic life. Inversion of the cane sugar frequently does not take place at all. However, quite aside from the element of chance in the formation of invert sugar, the latter is formed, if at all only slowly and progressively during the curing period; and particularly in the short cure is not present in material or adequate amounts at that stage in the curing process where it would otherwise be effective.

While the exact nature of the reactions which take place is not known, apparently the simultaneous exposure of the color complexes in the unaltered condition in which they occur in fresh meat, to nitrites in the presence of an adequate amount of reducing sugar and preferably at an early stage in the curing process when such natural pigments are more reactive, is responsible in part at least for the improved results obtained by the present invention. Whereas under old methods, i. e., the nitrate cure, color fixation was the slowest phase of curing, now, with the use of nitrite, the color phase of the cure is completed in as short a period as three days, making all important the early presence of reducing sugar.

For present purposes reducing sugars may be defined as those carbohydrates or their solutions, which in solution reduce solutions of metallic salts, such as copper or silver, in the presence of certain organic salts. Such sugars include starch conversion syrups and sugars (such, for example, as dextrose), maltose, levulose, lactose and invert sugar.

The invention has a special application to meats produced within a certain range or balance of conditions. This may be best understood by imagining the forces favorable to quality or stability of color on the one hand and the destructive forces on the other hand, as representing a sliding ratio which can roughly be divided into three zones.

In the first, the product is handled or cured in such manner and under what may be termed anaerobic conditions, that the forces favorable to a satisfactory color are in effective ascendancy, and fading or discoloration will not occur under normal conditions. Under anaerobic conditions, the meat tissue itself apparently is sufficiently reducing so that adequate reductions take place in the absence of sugar. In such a zone, therefore, treatment with reducing sugar contributes little to the superiority of the color as compared with a product cured without treatment with reducing sugar.

At the other extreme, the forces of color deterioration are so predominant that a reducing sugar is not sufficiently effective to throw the balance in favor of color preservation. The situation is practically hopeless from the standpoint of saving the desirable color, at least by the use of permissible agents. Under such extreme oxidizing conditions as would result from the formation of organic peroxide in the fat tissue or from peroxide formation of bacterial origin, reducing sugar apparently is not adequate to prevent undesirable oxidation.

In the intermediate or second zone, the forces of deterioration and color stabilization are in such equilibrium that it requires only the least unfavorable disturbance of the balance, to produce color deterioration. In this intermediate zone, where the protein of the meat tissue is not sufficient to prevent oxidation, reducing sugars become effective and active factors in throwing the balance in favor of a satisfactory stabilized color.

The action of the reducing sugar on meats in the aforesaid intermediate zone depends somewhat upon the conditions and manner of its use. This may be explained by the following theories:

First, the reducing sugar acts particularly on fresh meats such as fresh pork sausage and fresh hamburger, not only to reduce methemoglobin but as an anti-oxidant to prevent the formation of methemoglobin.

Second, the reducing sugar maintains the hemoglobin in the reduced condition favorable to the formation of nitroso-hemoglobin during the cure.

Third, in reducing sugar protects the nitroso-hemoglobin until in the course of curing and the subsequent application of heat, it is converted into nitroso-hemochromogen. The latter is very stable and apparently does not require the protective action of reducing sugar.

Fourth, the reducing sugar has restoring effect which is believed to be a reducing of nitroso-methemoglobin to nitroso-hemoglobin with subsequent conversion to nitroso-hemochromogen.

Treatment with reducing sugar according to the present invention is not limited to a specific method, but is susceptible of wide variation in method of application. In general, the reducing sugar may be applied to any form of fresh meat, such, for example, as pork sausage and beef hamburger, or to any form of cured meats, such, for example, as that treated by the sweet-pickle cure, the box cure for bacon, and the curing of sausage, including liver and summer sausage either as trimmings or as ground meat.

In the accompanying drawing an effort has been made to illustrate diagrammatically the desirable and undesirable reactions which control color. The heavy lines or arrows designate the direction of desirable reactions and the light arrows represent undesirable reactions. The diagram is believed to be largely self-explanatory. The oxyhemoglobin mentioned therein is simply arterial hemoglobin which carries oxygen loosely combined therewith. In freshly slaughtered meat it exists only for a short time being either reduced to hemoglobin or converted into methemoglobin, depending upon conditions. The diagram shows reduction of methemoglobin to oxyhemoglobin as desirable, but there is some doubt whether this reaction occurs under normal curing conditions. No attempt has been made to represent specific reactions in the nature of decomposition which may take place under abnormal conditions or in the unfavorable zone mentioned above.

The following, by way of illustration, is one method for treatment of box-cure bacon: A dry curing mixture is prepared having the proportion of 3 pounds of salt, 2¼ pounds of reducing sugar (such as dextrose), and one-fourth to one-half ounce of nitrite of soda per 100 pounds of bellies. The nitrite of soda may be replaced in the above by three ounces of sodium nitrate; or it may be partly replaced as in the so-called mixed cure wherein the proportions may vary considerably. The dry curing mixture is applied to the bacon in the usual manner and the product is pressed into the metal or wood boxes.

In a sweet pickle cure, one illustrative method comprises pumping trimmed fresh pork hams with a pickle comprising 30 pounds of reducing sugar, preferably crystalline dextrose, 1½ pounds of nitrite of soda per 100 gallons, and sufficient common salt to produce a salometer reading of 90°. After pumping, the hams are immersed approximately for 3½ days to the pound in a cover pickle which consists of 20 pounds of reducing sugar, preferably crystalline dextrose and 1 pound of nitrite of soda per 100 gallons, and sufficient common salt to give a final salometer reading of approximately 70°. If sodium nitrate be substituted wholly for nitrite of soda, it should be employed in the proportions of 6 pounds per 100 gallons of pump pickle and 4 pounds per 100 gallons of cover pickle.

Mixtures of sodium nitrite and sodium nitrate in various proportions within the limits laid down by the experience of the industry and the regulations of the Bureau of Animal Industry, may be substituted for the so-called straight nitrite, or straight nitrate cures. It is not essential that the sugar used be exclusively reducing sugar to secure the improved stable color. Apparently the reducing sugar may be partially replaced, at least to the extent of 50%, by cane sugar.

The loss of color bloom in cured products, such as hams and sausages when the surfaces are cut for exhibitions in stores, can be greatly lessened by coating, dipping or brushing the surfaces with a solution of reducing sugar, such, for example, as a 15 per cent solution of corn sugar. The effect is greatly improved if a small amount of glycerine (e. g., 5 per cent) be added to the solution which leaves upon evaporation sufficient glycerine to keep the surfaces desirably moist.

The color of smoked products cured with a non-reducing sugar can be improved if the products be soaked in a solution of reducing sugar before they are smoked. Merely by way of example, satisfactory results are produced if the products be soaked for an hour in a ten per cent solution of reducing sugar before smoking.

I have found that satisfactory results may be obtained by treating the products with reducing sugar prior to the addition of other curing agents. For example, the carcass may be injected through the circulatory system with a solution of reducing sugar, thereby conditioning the meat and making it more reactive with nitrates or nitrites.

Obviously the invention is not limited to the details of the illustrative process, since these may be variously modified. Moreover, it is not indispensable that all features of the invention be used conjointly, since various features may be used to advantage in different processes.

Having described my invention, I claim:

1. The method of curing meat which comprises conditioning the blood pigments by treating the meat to the action of a substantial amount of reducing sugar and treating the conditioned blood pigments with a nitrite pickle prepared by the direct addition of the nitrite.

2. The method of curing meat produced under conditions wherein the forces of color deterioration approximate those of color preservation which comprises treating the meat to a substantial amount of reducing sugar in the presence of a nitrite pickle prepared by the direct addition of the nitrite.

3. The method of producing a stable color in meat which is characterized by subjecting the meat simultaneously to a nitrite pickle and reducing sugar in such amount as to reduce the blood pigments for conversion by the nitrite into nitrosohemoglobin.

4. The method of stabilizing the color in meat produced under conditions where the natural forces of color stabilization are insufficient to combat the forces of color deterioration which is characterized by distributing through the meat reducing sugar such as dextrose to serve as an anti-oxidant with respect to the color complexes in the meat and curing the meat in the presence of reducing sugar to convert the blood pigments into nitrosohemoglobin.

5. The method of restoring desirable color characteristics to meat in which said color characteristics have became altered by oxidation products of hemoglobin, said method comprising treating such undesirably colored meat with reducing sugar to reduce said oxidation products of hemoglobin.

WINFORD LEE LEWIS.